United States Patent
Stephens

(10) Patent No.: US 7,349,950 B2
(45) Date of Patent: Mar. 25, 2008

(54) METHOD, SYSTEM AND STORAGE MEDIUM FOR ACCESSING DYNAMIC CONTENT

(75) Inventor: Robert Todd Stephens, Sharpsburg, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 768 days.

(21) Appl. No.: 10/410,742

(22) Filed: Apr. 10, 2003

(65) Prior Publication Data

US 2004/0205121 A1    Oct. 14, 2004

(51) Int. Cl.
*G06F 15/16* (2006.01)
(52) U.S. Cl. .................. 709/217; 709/203; 709/219
(58) Field of Classification Search ............. 709/201, 709/203, 218, 219, 217
See application file for complete search history.

(56) References Cited

U.S. PATENT DOCUMENTS

| | | | |
|---|---|---|---|
| 5,987,480 A * | 11/1999 | Donohue et al. | 715/501.1 |
| 6,826,594 B1 * | 11/2004 | Pettersen | 709/203 |
| 6,892,226 B1 * | 5/2005 | Tso et al. | 709/218 |
| 2003/0004998 A1 * | 1/2003 | Datta | 707/513 |
| 2003/0154239 A1 * | 8/2003 | Davis et al. | 709/201 |
| 2004/0205165 A1 * | 10/2004 | Melamed et al. | 709/219 |

FOREIGN PATENT DOCUMENTS

WO    WO 02/17082 A1 *    2/2002

* cited by examiner

*Primary Examiner*—Phuoc H Nguyen
(74) *Attorney, Agent, or Firm*—Cantor Colburn LLP

(57) ABSTRACT

An embodiment of the invention is a method for retrieving dynamic content over a network. The method includes receiving a request for dynamic content from a user and determining a source for the dynamic content. An assembly instruction is submitted via the network to the source of the dynamic content. The dynamic content is received via the network from the source of the dynamic content and provided to the user. Additional embodiments include a system and computer program product.

8 Claims, 3 Drawing Sheets

METHOD, SYSTEM AND STORAGE MEDIUM FOR ACCESSING DYNAMIC CONTENT

BACKGROUND OF THE INVENTION

The present invention relates generally to accessing content and in particular to accessing dynamic content over a network.

A wide variety of information may be retrieved over networks (e.g., Internet, LAN, VPNs). Much of this information is static, provided by the server hosting the web site and other information is dynamic which is generated upon user requests. For example, a user searching the Internet for airfares may visit a travel website which initially presents static content. The user typically requests a search of airfares and the web server retrieves dynamic content (subject to change by airlines, weather, promotions, etc) for the user to view.

A drawback to this type of information retrieval is that the user must "drill down" through static content to retrieve dynamic content, for each source of dynamic content. For example, to obtain airfares from three different travel websites, the user must visit each website, enter the search criteria and await the results. The user then may compare the dynamic content retrieved from each site by toggling between each site. Thus, there is a need in the art for a method of more effectively retrieving dynamic content over a network.

SUMMARY OF THE INVENTION

An embodiment of the invention is a method for retrieving dynamic content over a network. The method includes receiving a request for dynamic content from a user and determining a source for the dynamic content. An assembly instruction is submitted via the network to the source of the dynamic content. The dynamic content is received via the network from the source of the dynamic content and provided to the user. Additional embodiments include a system and computer program product.

BRIEF DESCRIPTION OF THE DRAWINGS

Referring to the exemplary drawings wherein like elements are numbered alike in the accompanying Figures.

DETAILED DESCRIPTION OF THE INVENTION

Figure 1:
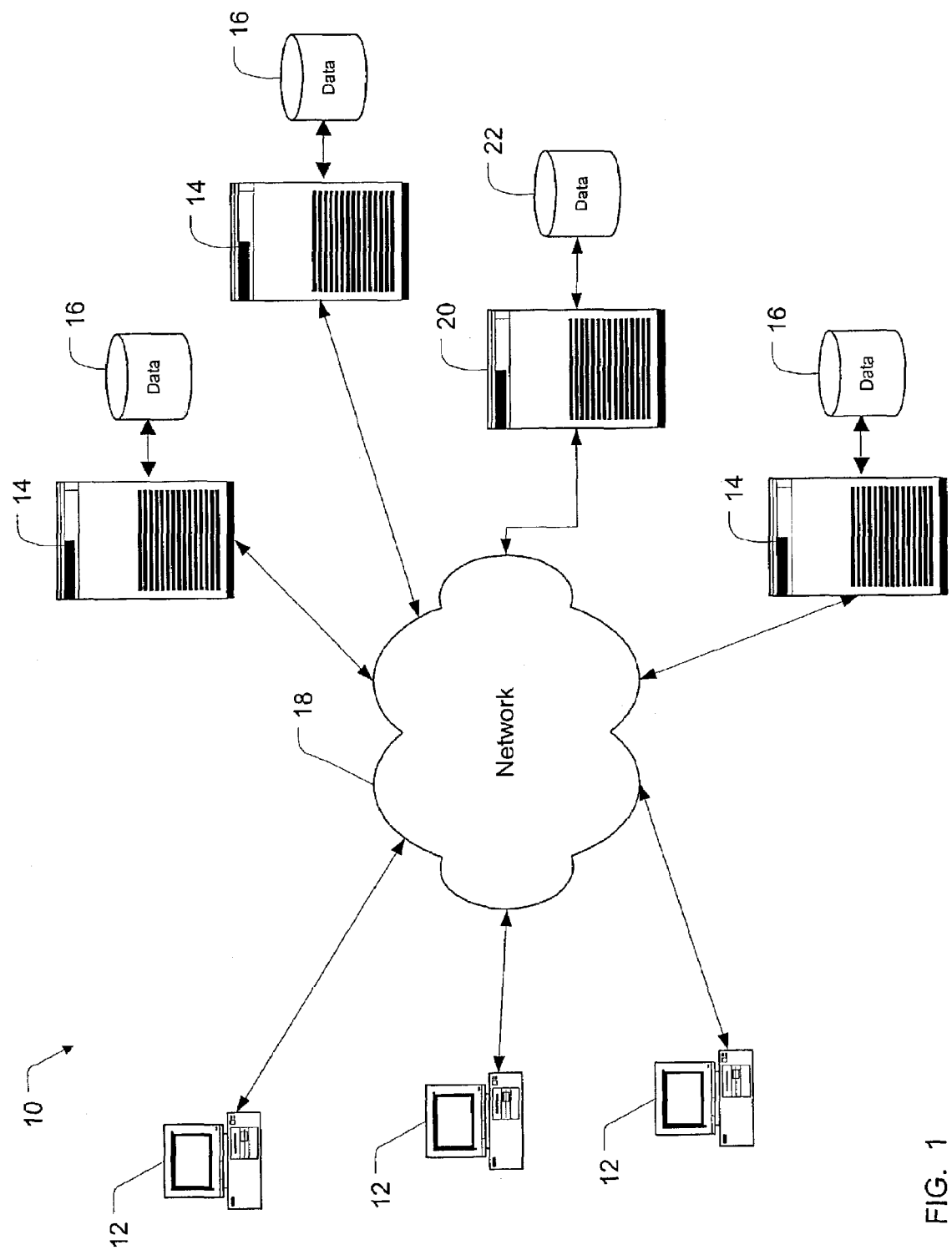
FIG. 1 is a block diagram of an exemplary system for implementing the invention.

FIG. 1 is a block diagram of an exemplary system for implementing the invention. The system includes one or more user systems 12 coupled to servers 14 and search engine 20 via a network 18. Each user system 12 may be implemented using a general-purpose computer executing a computer program for carrying out the processes described herein. The network 18 may be any type of known network including a local area network (LAN), wide area network (WAN), global network (e.g., Internet), intranet, etc. The user systems 12 may be coupled to the servers 14 and search engine 20 through multiple networks (e.g., intranet and Internet) so that not all user systems 12 are coupled to the servers 14 and search engine 20 via the same network. One or all of the user systems 12, servers 14 and search engine 20 may be connected to the network 18 in a wireless fashion and network 18 may be a wireless network. In a preferred embodiment, the network 18 is the Internet and each user system 12 executes a user interface application (e.g., web browser) to contact the servers 14 or search engine 20 through the Internet 18. Alternatively, a user system 12 may be implemented using a device programmed primarily for accessing network 18 such as a dumb terminal.

Servers 14 function as web servers, and may also execute applications. It is understood that more than one server may be used (e.g., dedicated web server and dedicated applications server). Each server 14 is coupled to one or more databases 16. Search engine 20 is also implemented through a server and is also coupled to a database 22. The search engine 20 serves as an access point for user systems 12 to obtain information, and relevant to the invention, dynamic content. As described in further detail herein, the search engine 20 retrieves dynamic content from each web server 14 in response to a user request without requiring the user to access each web server 14 individually.

Operation of system 10 will now be described with reference to a user at a user system requesting dynamic content. For purposes of illustration, an example is provided of a user searching for dynamic information concerning weather forecasts. It is understood that a wide variety of dynamic content may be accessed. It is also noted that dynamic content is differentiated from static content in that dynamic content is varying information distinct from the static web server content (e.g., HTML pages). For example, dynamic content from third parties in the form of airline fares may be retrieved from airline reservation databases and then presented in static web pages established by travel web sites.

Figure 2:
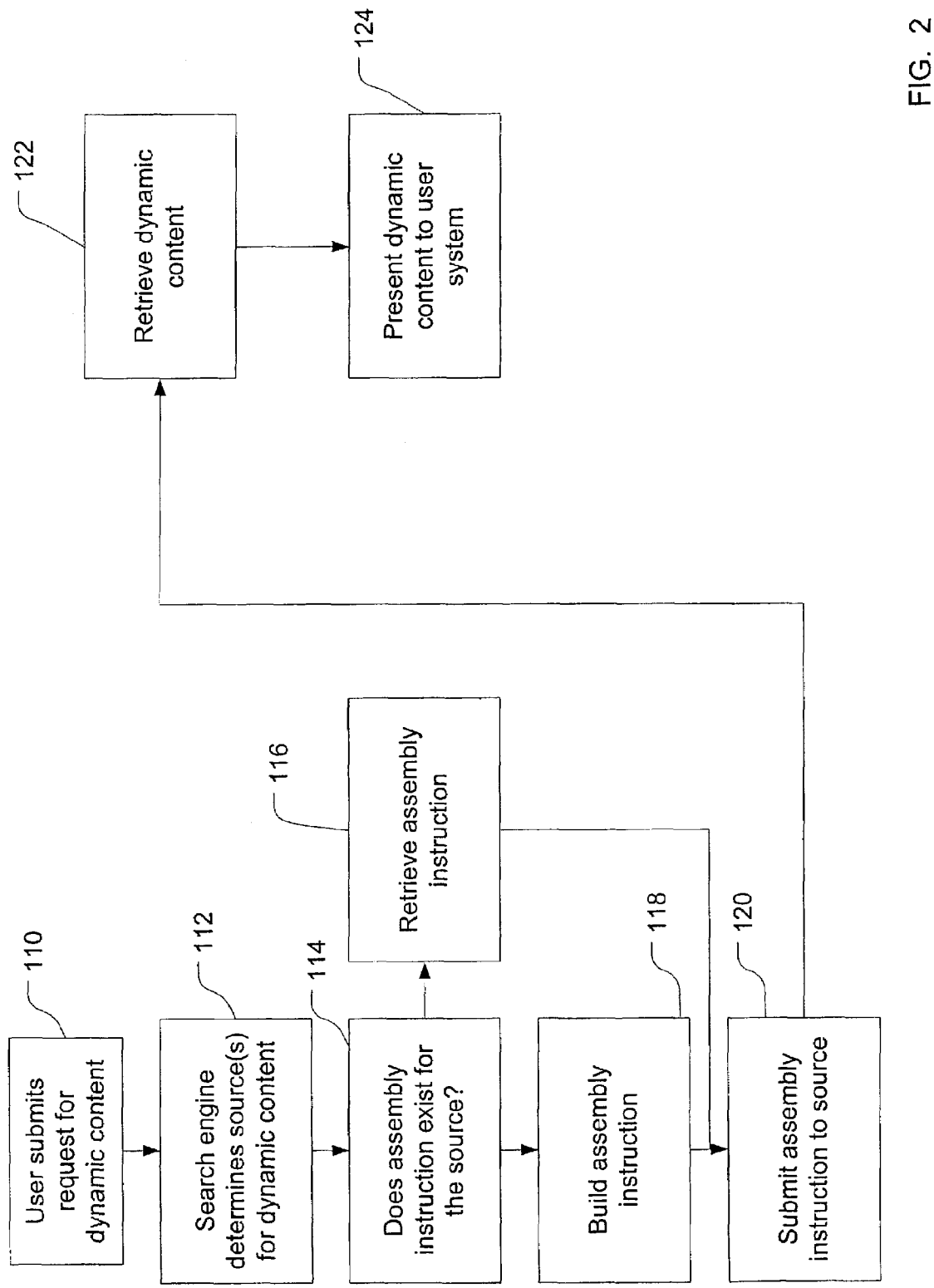
FIG. 2 is a flowchart of an exemplary process for retrieving dynamic content.

FIG. 2 is a flowchart of an exemplary process for retrieving dynamic content via a network. The process begins at step 110 where a user at user system 12 submits a request for dynamic content to search engine 20. The web browser application may include a function button that the user may select to indicate that the user is requesting dynamic content. The request for dynamic content, as opposed to a request for static content, may be fashioned in simple object application protocol (SOAP) messaging protocol or other format-independent messaging protocol. This allows the request to be processed by search engines using HTML, XML, MIME, etc.

When search engine 20 receives the request for dynamic content, search engine 20 determines the sources for the dynamic content using existing search techniques at step 112. For example, if the user has enter a request for dynamic content related to weather forecasts, the search engine 20 determines appropriate sources for the content to be weather sites such as weather.com, national weather service, etc.

Once the appropriate sources are determined, flow proceeds to step 114. Steps 114 through 120 may be executed for each identified source. At step 114, the web server 20 determines whether an assembly instruction already exists for the dynamic content for the source. As described further herein, the assembly instruction is a command that, when submitted to a server 14, retrieves the dynamic content. If a user had previously requested similar dynamic content, an appropriate assembly instruction will be stored in database 22, indexed by the source identifier and the content requested.

If an assembly instruction already exists for the source, the assembly instruction is retrieved at step 116. If the assembly instruction does not exist in database 22, the search engine 20 builds the assembly instruction at step 118. Building of the assembly instruction includes the search engine 20 accessing the source, for example one of the web servers 14, and determining an assembly instruction based on the metatags and metadata contained on the web server 14.

Search engine 20 accesses web server 14 and determines how dynamic content is arranged by the web server 14 by examining metatags associated with metadata. Several mechanisms facilitate how the search engine 20 detects the arrangement of data on the web server 14. For example, metadata may be arranged based on the Dublin Core Metadata Initiative (DCMI) which defines a standard set of descriptive tags.

The standard summarizes the updated definitions for the Dublin Core metadata elements as originally defined by the DCMI. The definitions utilize a formal standard for the description of metadata elements. This formalization helps to improve consistency with other metadata communities and enhances the clarity, scope, and internal consistency of the Dublin Core metadata element definitions. There are 15 basic elements defined by the DCMI and these are presented in Table 1.

TABLE 1

Dublin Core Elements

| Element | Description |
|---|---|
| Title | A name given to the resource |
| Creator | An entity primarily responsible for making the content of the resource |
| Subject | The topic of the content of the resource |
| Description | An account of the content of the resource |
| Publisher | An entity responsible for making the resource available |
| Contributor | An entity responsible for making contributions to the content of the resource. |
| Date | A date associated with an event in the life cycle of the resource |
| Type | The nature or genre of the content of the resource |
| Format | The physical or digital manifestation of the resource |
| Identifier | An unambiguous reference to the resource within a given context |
| Source | A Reference to a resource from which the present resource is derived |
| Language | A language of the intellectual content of the resource |
| Relation | A reference to a related resource |
| Coverage | The extent or scope of the content of the resource |
| Rights | Information about rights held in and over the resource |

Thus, the use of standardized metatags facilitates search engine 20 determining how dynamic content is arranged by the web server 14 and building the assembly instruction.

Furthermore, Extensible Markup Language (XML) provides additional mechanisms for describing data structures. XML is a meta-markup language that provides a format for describing structured data. This facilitates more precise declarations of content and more meaningful search results across multiple platforms. The intent of the XML format is to create a means of exchanging information over the Internet. This information would be both data and the content information.

XML allows the user to bring multiple files together to form compound documents and the ability to add editorial comments to a file. This type of expansion allows the author to provide processing controls to the document along with the data descriptors. XML does not setup a predefined set of tags as HTML does for web base documents. XML is very similar to a logical model that is defined by using modeling tools.

By using mechanisms such as standardized metatags and XML, a variety of dynamic metadata may be accessed by constructing the assembly instruction. Exemplary types of metadata include database and data transformation metadata, system and interface metadata, reusable component metadata, messaging metadata, web service metadata, XML metadata and metric metadata.

Below is an example of two different assembly instructions built based on a user's search for weather conditions in West Hartford, Conn. As described above, the user may submit a request for dynamic content to search engine 20 including terms "weather" "West Hartford" "06119". The search engine 20 first determines appropriate web servers that may provide relevant content using known techniques. The search engine 20 may locate a server 14 hosting the weather.com website and a server 14 hosting the national weather service website.

Once the sources for dynamic content are located, and the search engine 20 then determines that an assembly instruction does not already exist for weather.com, the search engine 20 builds the assembly instruction by accessing metatags and metadata at each source. Use of standard metatags and/or metadata descriptors (such as those in XML) facilitate this task. By accessing the metadata descriptions provided by the web server 14, search engine 20 determines how content is arranged on the web server 14. The search engine 20 then builds the assembly instruction for the weather.com server as follows:

http://www.weather.com/outlook/recreation/local/
06119?lwsa=WeatherLocalUndecla red&lswe=06119.

The assembly instruction is then stored in database 22 so that upon request for the same dynamic content, the search engine 20 can simply retrieve the assembly instruction as discussed above with reference to step 116.

As noted above, for each source of dynamic content, the search engine 20 builds an assembly instruction. Thus, the search engine 20 access a server 14 hosting the national weather service home page. Again, if an assembly instruction already exists for the requested dynamic content, the search engine 20 retrieves the stored assembly instruction. Otherwise, the search engine 20 builds the assembly instruction by examining metatags and metadata of web server 14. Use of standard metatags and/or metadata descriptors (such as those in XML) facilitate this task. By accessing the metadata descriptions provided by the web server 14, search engine 20 determines how content is arranged on the web server 14. The search engine 20 then builds the assembly instruction as follows:

http://www.srh.noaa.gov/data/forecasts/
CTZ002.php?warncounty=CTC003&city=W+Hartford.

The assembly instruction is then stored in database 22 so that upon request for the same dynamic content, the search engine 20 can simply retrieve the assembly instruction as discussed above with reference to step 116.

Figure 3:
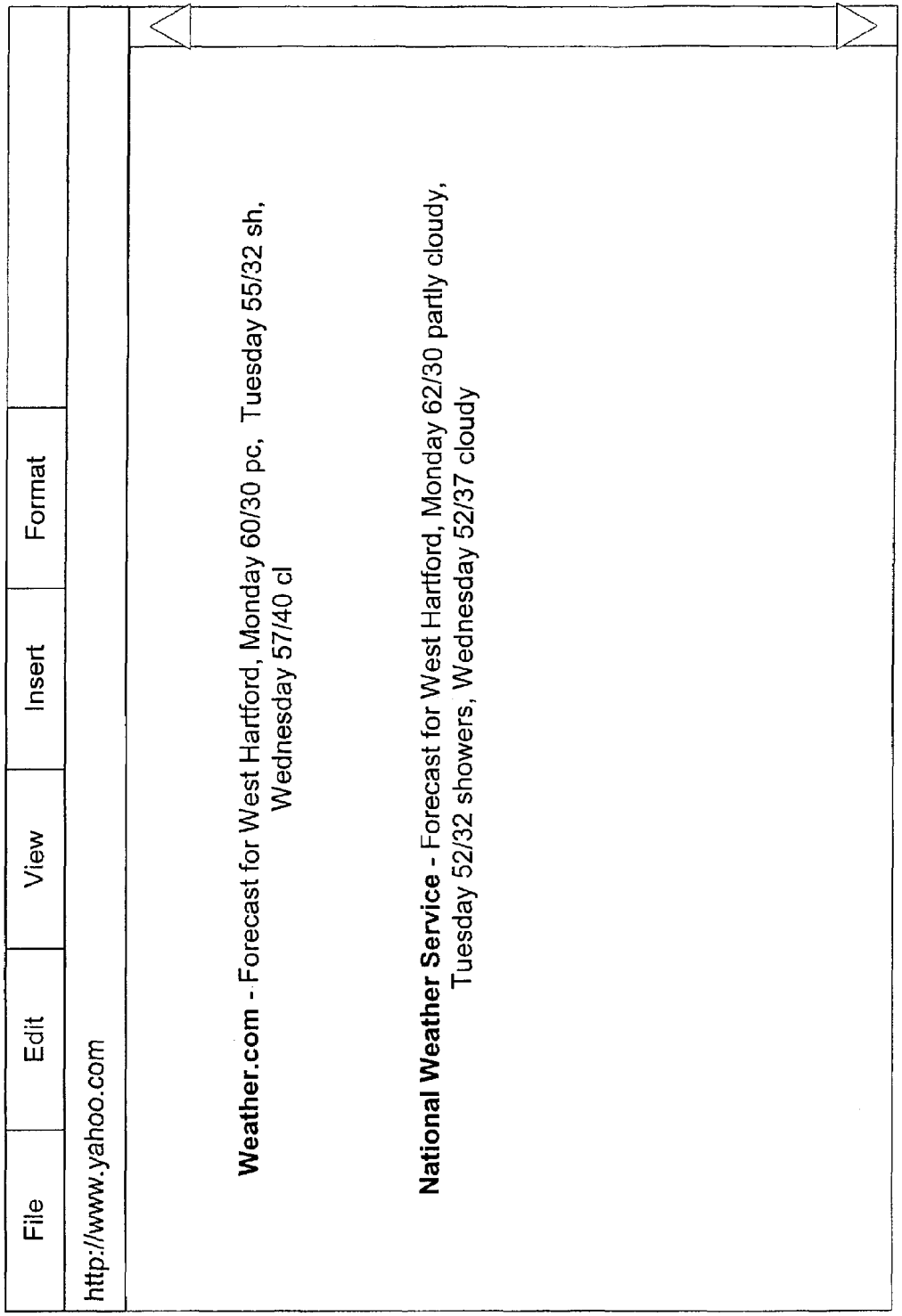
FIG. 3 is an exemplary user interface presenting the retrieved dynamic content.

Search engine 20 then submits the assembly instructions to the corresponding web servers 14 and retrieves the dynamic content. In this, example the dynamic content is the weather forecast for West Hartford, Conn. Two sources were accessed with two different assembly instructions. The dynamic content is provided to the user system 12. FIG. 3 provides an exemplary representation of the dynamic content provide to the user system 12. As shown in FIG. 3, the user system 12 receives the underlying dynamic content rather than a list of web sites capable of providing dynamic content. The user may then select the hyperlinks associated with each website if desired.

The above described exemplary embodiments allow a user to retrieve dynamic content through a search engine without accessing each web server individually. This streamlines obtaining dynamic content. Although examples of dynamic content have been described, it is understood that a variety of dynamic content may be retrieved and the invention is not limited to specific dynamic content discussed herein.

As described above, the present invention can be embodied in the form of computer-implemented processes and apparatuses for practicing those processes. In an exemplary embodiment, the invention is embodied in computer program code executed by the search engine. The present invention may be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method for retrieving dynamic content over a network, the method comprising:
   receiving a single request for dynamic content from a user;
   determining sources for the dynamic content, wherein the sources for the dynamic content includes a first web server generating the dynamic content and a second web server generating the dynamic content, the first web server being different from the second web server;
   generating a first assembly instruction in response to the single request for dynamic content and an arrangement of data on the first web server;
   generating a second assembly instruction in response to the single request for dynamic content and an arrangement of data on the second web server, the first assembly instruction being different than the second assembly instruction;
   submitting the first assembly instruction to the first web server for generating first dynamic content;
   submitting the second assembly instruction to the second web server for generating second dynamic content;
   retrieving the first dynamic content and the second dynamic content via the network;
   providing the first dynamic content and the second dynamic content to the user;
   the generating said the first assembly instruction includes accessing one of metatags and metadata maintained at the first web server generating the dynamic content and building the first assembly instruction in response to the one of metatags and metadata; and
   storing said the first assembly instruction for use with a subsequent request for the dynamic content.

2. The method of claim 1 wherein:
   the request is submitted in a format-independent messaging protocol.

3. The method of claim 2 wherein:
   the format-independent messaging protocol is a simple object application protocol.

4. The method of claim 1 wherein:
   the generating the first assembly instruction includes retrieving an assembly instruction from memory.

5. A tangible storage medium encoded with machine-readable computer program code for retrieving dynamic content over a network, the storage medium including instructions for causing a search engine to implement a method comprising:
   receiving a single request for dynamic content from a user;
   determining sources for the dynamic content, wherein the sources for the dynamic content includes a first web server generating the dynamic content and a second web server generating the dynamic content, the first web server being different from the second web server;
   generating a first assembly instruction in response to the single request for dynamic content and an arrangement of data on the first web server;
   generating a second assembly instruction in response to the single request for dynamic content and an arrangement of data on the second web server, the first assembly instruction being different than the second assembly instruction;
   submitting the first assembly instruction to the first web server for generating first dynamic content;
   submitting the second assembly instruction to the second web server for generating second dynamic content;
   retrieving the first dynamic content and the second dynamic content via the network;
   providing the first dynamic content and the second dynamic content to the user;
   the generating said the first assembly instruction includes accessing one of metatags and metadata maintained at the first web server generating said the first dynamic content and building the first assembly instruction in response to the one of metatags and metadata; and
   storing said the first assembly instruction for use with a subsequent request for the dynamic content.

6. The storage medium of claim 5 wherein:
the request is submitted in a format-independent messaging protocol.

7. The storage medium of claim 6 wherein:
the format-independent messaging protocol is a simple object application protocol.

8. The storage medium of claim 5 wherein:
the generating the first assembly instruction includes retrieving an assembly instruction from memory.

* * * * *